United States Patent
Jhanwar et al.

(10) Patent No.: US 7,251,812 B1
(45) Date of Patent: Jul. 31, 2007

(54) DYNAMIC SOFTWARE UPDATE

(75) Inventors: Raj Jhanwar, Bothell, WA (US); Tom Yaryan, Seattle, WA (US); David Hennessey, Duvall, WA (US); Ovidiu G. Temereanca, Bellevue, WA (US); Seetharaman Harikrishnan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 10/044,570

(22) Filed: Jan. 11, 2002

Related U.S. Application Data

(63) Continuation-in-part of application No. 10/004,073, filed on Oct. 31, 2001.

(51) Int. Cl.
G06F 9/445 (2006.01)
G06F 9/44 (2006.01)
G06F 9/00 (2006.01)

(52) U.S. Cl. .................. 717/171; 717/176; 713/2; 713/100

(58) Field of Classification Search ......... 717/168–178
See application file for complete search history.

(56) References Cited

U.S. PATENT DOCUMENTS

| | | | |
|---|---|---|---|
| 5,359,730 A | 10/1994 | Marron | |
| 5,469,573 A | 11/1995 | McGill et al. | |
| 5,684,996 A | 11/1997 | Westerholm et al. | |
| 5,713,024 A | 1/1998 | Halladay | |
| 6,006,034 A | 12/1999 | Heath et al. | |
| 6,080,207 A | 6/2000 | Kroening et al. | |
| 6,110,228 A | 8/2000 | Albright et al. | |
| 6,131,192 A | 10/2000 | Henry | |
| 6,138,179 A | 10/2000 | Chrabaszcz et al. | |
| 6,188,779 B1 | 2/2001 | Baum | |
| 6,189,051 B1 | 2/2001 | Oh et al. | |
| 6,199,203 B1 | 3/2001 | Saboff | |
| 6,202,207 B1 | 3/2001 | Donohue | |
| 6,223,345 B1 * | 4/2001 | Jones et al. | 717/100 |
| 6,243,766 B1 | 6/2001 | Sliger et al. | |
| 6,282,711 B1 | 8/2001 | Halpern et al. | |
| 6,286,138 B1 | 9/2001 | Purcell | |
| 6,377,958 B1 | 4/2002 | Orcutt | |

(Continued)

FOREIGN PATENT DOCUMENTS

EP 0 817 014 A2 7/1998

(Continued)

OTHER PUBLICATIONS

Cook et al., "Highly Reliable Upgrading of Components," Proceedings of the 1999 International Conference on Software Engineering, May 1999, U.S.A., pp. 203-212.

(Continued)

Primary Examiner—Tuan Dam
Assistant Examiner—Andre R Fowlkes
(74) Attorney, Agent, or Firm—Senniger Powers

(57) ABSTRACT

A system and method for dynamically updating software on one or more installation media for installation on at least one destination machine. The invention obtains update content from one or more update media and merges the update content with the software on the installation media prior to installing the software on the destination machine. The software to be installed includes application programs and operating system software.

31 Claims, 7 Drawing Sheets

U.S. PATENT DOCUMENTS

| | | | |
|---|---|---|---|
| 6,463,584 B1 * | 10/2002 | Gard et al. | 717/171 |
| 6,532,474 B2 | 3/2003 | Iwamoto et al. | |
| 6,711,624 B1 * | 3/2004 | Narurkar et al. | 719/321 |
| 2002/0013939 A1 | 1/2002 | Daynes et al. | |
| 2002/0016956 A1 | 2/2002 | Fawcett | |
| 2002/0049966 A1 * | 4/2002 | Lin | 717/178 |
| 2002/0073398 A1 * | 6/2002 | Tinker | 717/110 |
| 2002/0120725 A1 | 8/2002 | DaCosta et al. | |
| 2002/0156877 A1 | 10/2002 | Lu et al. | |
| 2002/0188941 A1 | 12/2002 | Cicciarelli et al. | |
| 2002/0194398 A1 | 12/2002 | Bentley et al. | |
| 2003/0233379 A1 | 12/2003 | Cohen et al. | |
| 2004/0070678 A1 | 4/2004 | Toyama et al. | |
| 2004/0218902 A1 | 11/2004 | Yanagita | |

FOREIGN PATENT DOCUMENTS

| | | |
|---|---|---|
| GB | 2 334 354 A | 2/1998 |
| WO | WO 99/49394 A1 | 9/1999 |
| WO | WO 99/59059 A1 | 11/1999 |

OTHER PUBLICATIONS

Kunz et al., "The ISU Micronet Scout," Proceedings of the 25th SIGUCCS Conference on User Services, Nov. 1997, U.S.A., pp. 185-195.

Mather, "Automated Installation and Updating of Windows-based Internet Applications at James Madison University," Proceedings of the 23rd ACM SIGUCCS Conference on Winning the Networking Game, Oct. 1995, U.S.A., pp. 207-209.

Hall et al., "A Cooperative Approach to Support Software Deployment Using the Software Dock," Proceedings of the 1999 International Conference on Software Engineering, May 1999, U.S.A., pp. 174-183.

Zhang et al., "A Modeling Perspective of Image-Based Installation," Dell White Paper, pp. 1-13, Mar. 2002, U.S.A.

White Paper, "Microsoft Windows 2000 Server—Remote Operating System Installation," Microsoft Corporation, pp. i-iv, 1-41, 1999, U.S.A.

Chapter 4—Installing Windows 2000 Professional, Microsoft Windows 2000 Professional Resource Kit, 30 pages, Microsoft Corporation, 2001, U.S.A.

Chapter 5—Customizing and Automating Installations, Microsoft Windows 2000 Professional Resource Kit, 61 pages, Microsoft Corporation, 2001, U.S.A.

Thurrott, "Windows XP Deployment," Feb. 23, 2001, Duke Communications International, Inc., U.S.A., website archived Mar. 31, 2001, accessed and printed May 8, 2006 from http://web.archive.org/web/20010331052118/http://www.winsupersite.com/showcase/windowsxp_deploy.asp>.

* cited by examiner

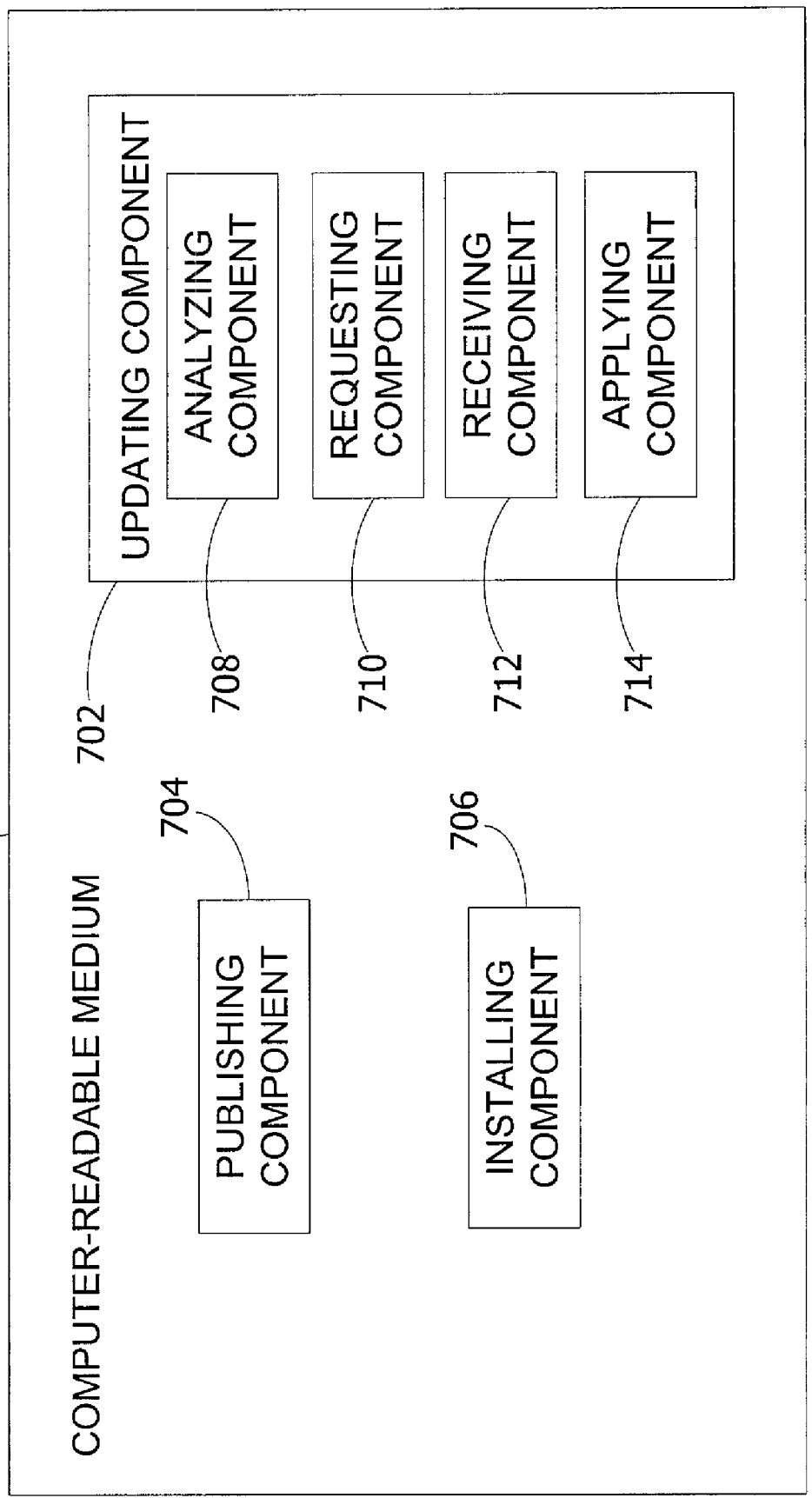

DYNAMIC SOFTWARE UPDATE

CROSS-REFERENCE TO RELATED APPLICATION

This is a continuation-in-part of U.S. Ser. No. 10/004,073 a commonly-assigned U.S. patent application filed Oct. 31, 2001, entitled "Dynamic Software Update," the entire disclosure of which is incorporated by reference herein for all purposes.

TECHNICAL FIELD

The present invention relates to the field of computer operating systems. In particular, this invention relates to a system and method for dynamically updating software prior to installation on a destination computer.

BACKGROUND OF THE INVENTION

Retail software distributed on a computer-readable medium such as a CD-ROM often becomes outdated soon after release. For example, software patches and additional drivers may be available after the software has been released for distribution. When a user installs the software, the CD-ROM with the retail software does not contain the most up to date information.

Some prior art systems provide for the updating of the software after the software is installed. For example, the Windows Update service from Microsoft Corporation allows installed software to receive certain updates from a remote server. Tax preparation software is another example of software that may be updated after the software has been installed by receiving updated tax forms from a remote server. However, the software updates may contain critical fixes necessary for stable installation or operation of the software. In addition, the updates necessary for software installed on a particular destination machine may differ based on the particular destination machine.

For these reasons, a system for dynamically updating software prior to installation and specific to the destination machine is desired to address one or more of these and other disadvantages.

SUMMARY OF THE INVENTION

The invention includes a system and method for dynamically updating software stored on one or more installation media for installation on at least one destination machine. The invention obtains update content from one or more update media remote from the destination machine and merges the update content at the destination machine with the software on the installation media prior to installing the software on the destination machine. The software includes application programs and operating system software.

The invention fixes problems prior to the problems occurring by retrieving a minimal set of the most critical fixes to improve the software setup experience and to provide stable and secure software. The invention ensures that software installed onto a machine automatically includes the most critical updates and fixes deemed necessary for a successful installation. In addition, the invention enables the software developers to update the components on the distribution medium remotely, such as via the Internet.

The invention improves responsiveness for installation problems, reduces support cost by reducing product support calls, increases customer satisfaction by improving the customer's out-of-box (first user) and upgrade experiences, minimizes the download time and size by including only the most critical updates, and improves upgrade compatibility. By including important updates at installation time, the invention improves the stability of an operating system.

In accordance with one aspect of the invention, a method dynamically updates software stored on one or more installation media for installation on at least one destination machine. The method obtains update content from one or more update media and merges the update content at the destination machine with the software on the installation media prior to installing the software on the destination machine.

In accordance with another aspect of the invention, a system dynamically updates software with update content. The system includes an update site and an installation application program. The update site delivers the update content to a destination machine having access to at least one installation medium storing installation data. The installation application program operates on the destination machine to receive the update content from the update site and to merge the received update content with the installation data on the installation medium prior to installing the installation data on the destination machine.

In accordance with yet mother aspect of the invention, a computer-readable medium has one or more computer-executable components for dynamically updating software on an installation medium prior to installation of the software on a destination machine. The components include an updating component on the destination machine for obtaining update content from a source remote from the destination machine and applying the update content to the software to update the software prior to installation of the software.

In accordance with yet another aspect of the invention, a system dynamically updates software stored on one or more installation media for installation on at least one destination machine. The system comprises means for obtaining update content from one or more update media remote from the destination machine and means for merging the update content at the destination machine with the software on the installation media prior to installing the software on the destination machine.

Alternatively, the invention may comprise various other methods and apparatuses.

Other features will be in part apparent and in part pointed out hereinafter.

BRIEF DESCRIPTION OF THE DRAWINGS

FIG. 7 is a block diagram of one embodiment of the invention illustrating the updating component, the publishing component, and the installation component.

Corresponding reference characters indicate corresponding parts throughout the drawings.

DETAILED DESCRIPTION OF THE INVENTION

Figure 1:
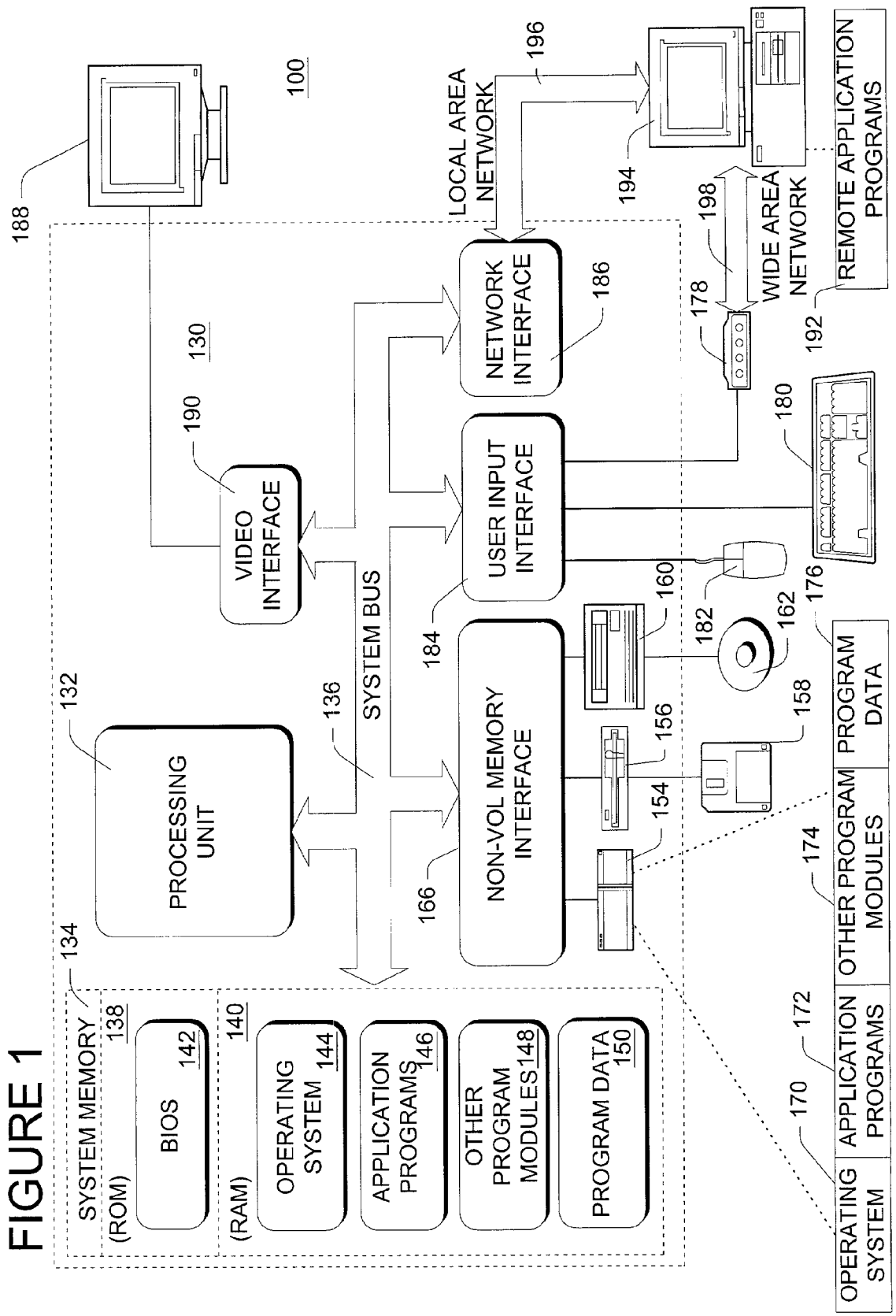
FIG. 1 is a block diagram of one embodiment of the method and system of the invention illustrating one example of a suitable computing system environment on which the invention may be implemented.

The invention includes a method for dynamically updating software prior to installing the software on a destination machine. The method includes obtaining update content from an update site and merging the update content with the software to be installed at the destination machine. If the software to be installed is stored on a read-only computer-readable medium, the update content is merged with the software during installation leaving the read-only computer-readable medium intact. If the software to be installed is stored on a writeable computer-readable medium, the writeable computer-readable medium may be altered by the merging of the update content with the software to be installed. The software to be installed includes, but is not limited to, application programs or operating system software. In one embodiment, the method is performed by an installation application program operating on the destination machine.

The invention connects to the update site, downloads any updates to the software being installed, and integrates the updates into the installation process. Any file may be updated or extended including, but not limited to, updates to application compatibility databases, fixes to operating system core files, fixes to an application program, fixes to the installation program itself (e.g., the setup process), and the addition of available drivers. The invention downloads required drivers and other updated files, which are important at setup time such as application compatibility database as well as any other critical fixes. Sometimes known as "pre-patching," the method of the invention provides only the most critical fixes to improve both the setup experience and the resulting operating system (OS) experience by providing a stable and secure operating system. The updates on the update site are selected carefully to include minimum fixes (e.g., only the necessary fixes) so as to minimize download time and/or size for the user. This also minimizes potential risk for the user. For example, some of the critical fixes can be selected for installation as part of the dynamic update of the setup process to ensure their installation. After the setup process restarts, the remaining necessary fixes can be installed. In one embodiment, the invention integrates the Internet with classic operating system installation from a computer-readable medium such as a CD-ROM.

The invention updates the software to be installed prior to installation of the software. In this manner, the invention provides a better first experience for the user and a more stable and secure operating system the first time a user boots the system. In contrast, some prior art systems attempt to fix a broken operating system after installation is complete. Similarly, the operating system may be vulnerable to attack by, for example, a virus if a user accesses a web page over the Internet prior to installing a critical security update. With the invention, any such critical security update can be installed as part of the dynamic update of the setup process to ensure that the security update is installed. In this instance, such a critical security update can be made part of the minimum set of critical updates.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In one embodiment of the invention, a computer such as the computer 130 is suitable for use in the other figures illustrated and described herein. For example, computer 130 is suitable for use as the destination machine or as part of the update site.

Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Figure 2:
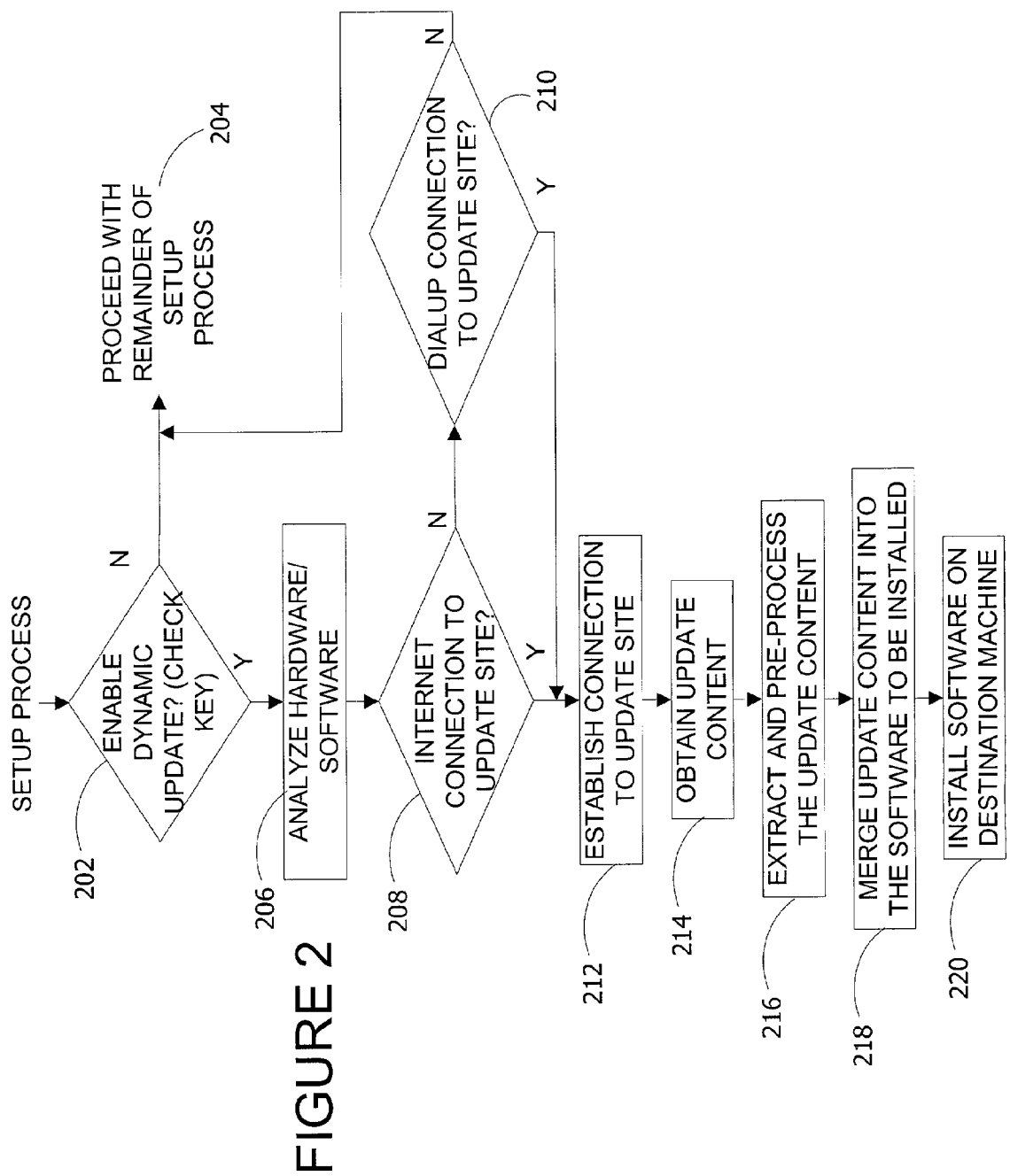
FIG. 2 is a flow chart of one embodiment of the invention illustrating the dynamic update of software.

Referring next to FIG. 2, a flow chart illustrates the dynamic update of software. The method of the invention includes dynamically updating software on one or more installation media prior to installation of the software on at least one destination machine. In the embodiment of FIG. 2, the setup process obtains update content specific to the software to be installed and specific to the destination machine. In the alternative, the setup process obtains the update content specific only to the software to be installed. Further, the setup process may obtain update content to update any aspect of the software embodying the setup process itself (i.e., a self-update of the setup process).

If modules associated with the setup process have been updated, the setup process can be restarted seamlessly with the updated modules. During the restarting, the setup process remembers previous user choices and does not prompt for the user choices again. That is, the setup process retains the user preferences identified prior to the restarting of the setup process. These preferences may be stored, for example, in a file accessible by the setup process.

The setup process includes determining at 202 whether dynamic update is enabled. In one embodiment, the setup process prompts the user to select whether dynamic update is enabled. For example, a user interface (UI) provides check boxes to allow the user to select whether dynamic update is enabled. For example, the check boxes may include "Yes, download the updated Setup files (Recommended)" or "No, skip this step and continue installing the operating system." In an alternative embodiment, enablement can be specified via a key stored in a registry. If dynamic update is not enabled, the remainder of the setup process continues at 204. If dynamic update is enabled, the setup process includes analyzing the hardware and/or software at 206 and determining at 208 whether an Internet connection is available from a destination computer to an update site. Alternatively, the setup process may first determine at 208 whether an Internet connection is available and then analyze the hardware and/or software at 206 associated with the destination computer. The hardware/software analysis may include identifying meta-data information such as a SKU, an operating system (if installed), attached peripherals, memory limitations, version information, connection speed, processor information, and/or whether the OS installation is an upgrade or a new OS installation. The hardware/software analysis includes a routine for gathering the meta-data information to identify the files to be requested. The setup process uses the meta-data information to identify the most appropriate update content to be requested from the update site.

Figure 6:
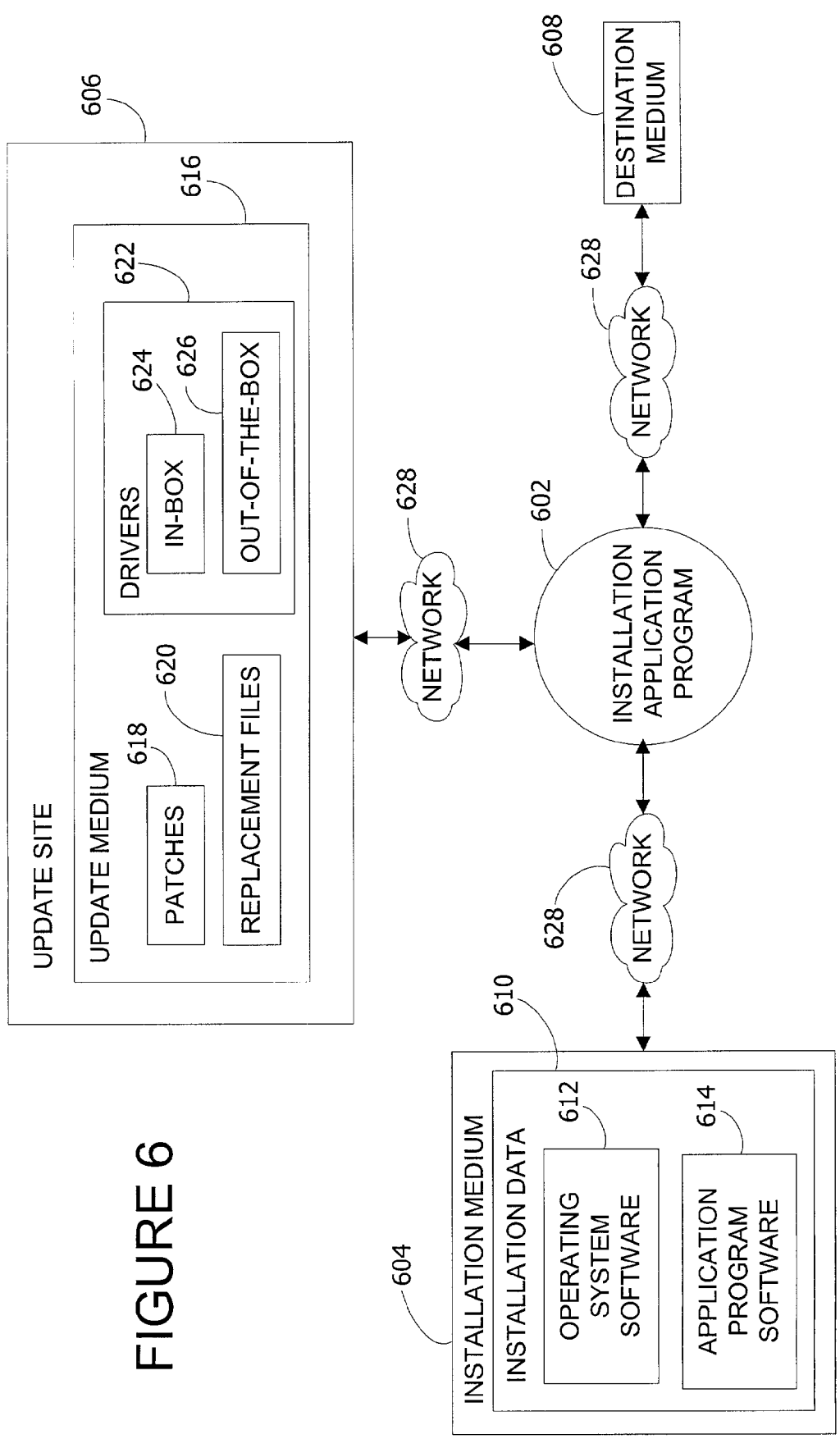
FIG. 6 is a block diagram of one embodiment of the invention illustrating the connections between the installation application program, the installation medium, the update site, and the destination medium.

In general, the setup process makes any connection to the update site including, but not limited to, via the Internet, LAN, WAN, dial-up, other connection, or a combination of connections. In FIG. 6, if a direct Internet connection does not exist, the setup process includes determining at 210 whether any connection to the Internet (e.g., dial-up, network, or otherwise) is available from the destination computer to the update site. If the setup process cannot automatically establish a connection, the setup process prompts the user to establish a connection. If the connection is unavailable, the remainder of the setup process continues at 204. If the Internet connection or the dial-up connection or any other connection to the update site is available, the setup process establishes a connection at 212 to the update site and obtains at 214 the update content from one or more update media. In a networked embodiment, the setup process accesses the update media via the Internet. For example, the update site may be an Internet-accessible site associated with a developer or producer of the software. Alternatively, the update site may be a network-accessible site associated with the destination machine such as in a corporate LAN setting.

The update content includes, but is not limited to, software including at least one file, a patch, or a driver for controlling hardware on the destination machine. The patch modifies the software on the installation media. For example, the patch may reflect a delta between an original file and a modified file. By applying the delta to the original file to produce the modified file, the update can be made on the destination machine without downloading the entire modified file. Such a patch saves download size and time. In one embodiment, the update content is a standard update package that is available for the specific hardware. The setup process includes extracting and pre-processing the update content at 216. The updated content is merged at 218 into the software to be installed on the destination machine prior to installing the software on the destination machine. Merging the update content with the software includes, but is not limited to, one or more of the following: patching, replacing, or adding to the software on the installation medium using the update content. The setup process also installs at 220 the merged software on the destination machine. The invention includes one or more computer readable media having computer-executable instructions for performing the method illustrated in FIG. 2.

In one embodiment, the update content is separated into two categories: content that has been verified or tested to work properly in the context of the setup process (e.g., a GUI mode setup process); and content that has not been tested in the context of the setup process. That is, the update content includes information identifying whether each of the files associated with the update content has been verified to execute with the setup process. Distinguishing the verified update content provides flexibility and makes the setup process more robust by allowing updates within the update content to be installed in a particular order. For example, the setup process can be stopped and re-started during a restartable phase. After the restartable phase, there comes a point at which the setup process is committed and there is a working OS. After the restartable phase, the setup process can install a set of updates created to ensure a good experience with the OS for the user. In this manner, if for some reason there is a problem with the dynamic update installs in the post-restartable phase, a working OS exists to which the user can return to install updates at a later point (e.g., via an "autoupdate" feature).

Figure 3:
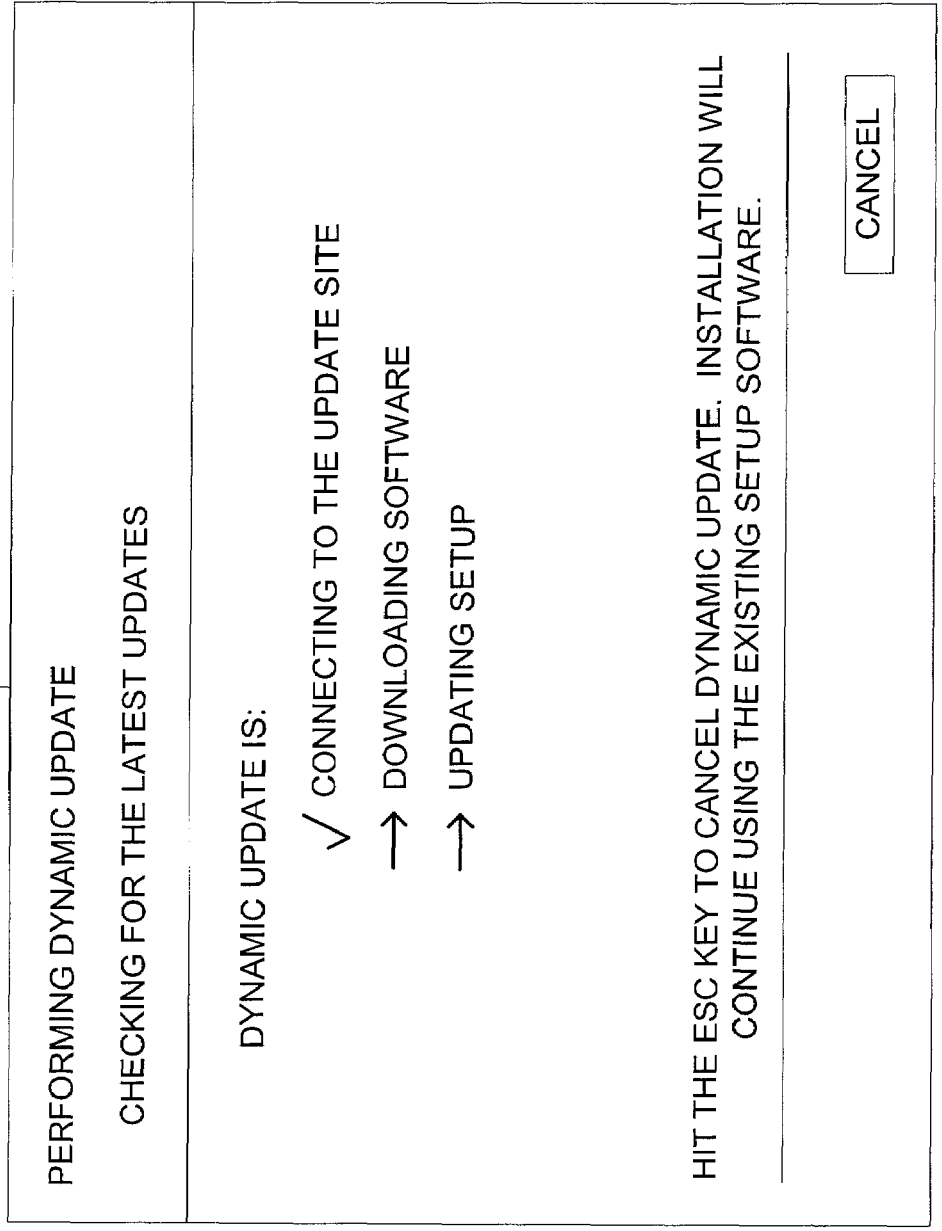
FIG. 3 is an exemplary embodiment of one embodiment of the invention illustrating operation of the dynamic update of software.

Referring next to FIG. 3, an exemplary embodiment of the invention illustrates operation of the dynamic update of software. FIG. 3 illustrates a graphical user interface (GUI) 302 associated with the dynamic update of setup software. Performing the dynamic update of the setup software includes checking for the latest updates. The dynamic update process connects to an update site, downloads updated setup software, and updates the existing setup software. The GUI 302 includes a cancel button allowing a user to press the button or hit an escape key to cancel the dynamic update. Installation continues via the existing setup software if the user presses the cancel button or the escape key during the dynamic update. In an alternative embodiment, a user interface (UI) informs the user that dynamic update is being performed without detailing the operations of dynamic update.

Figure 4:
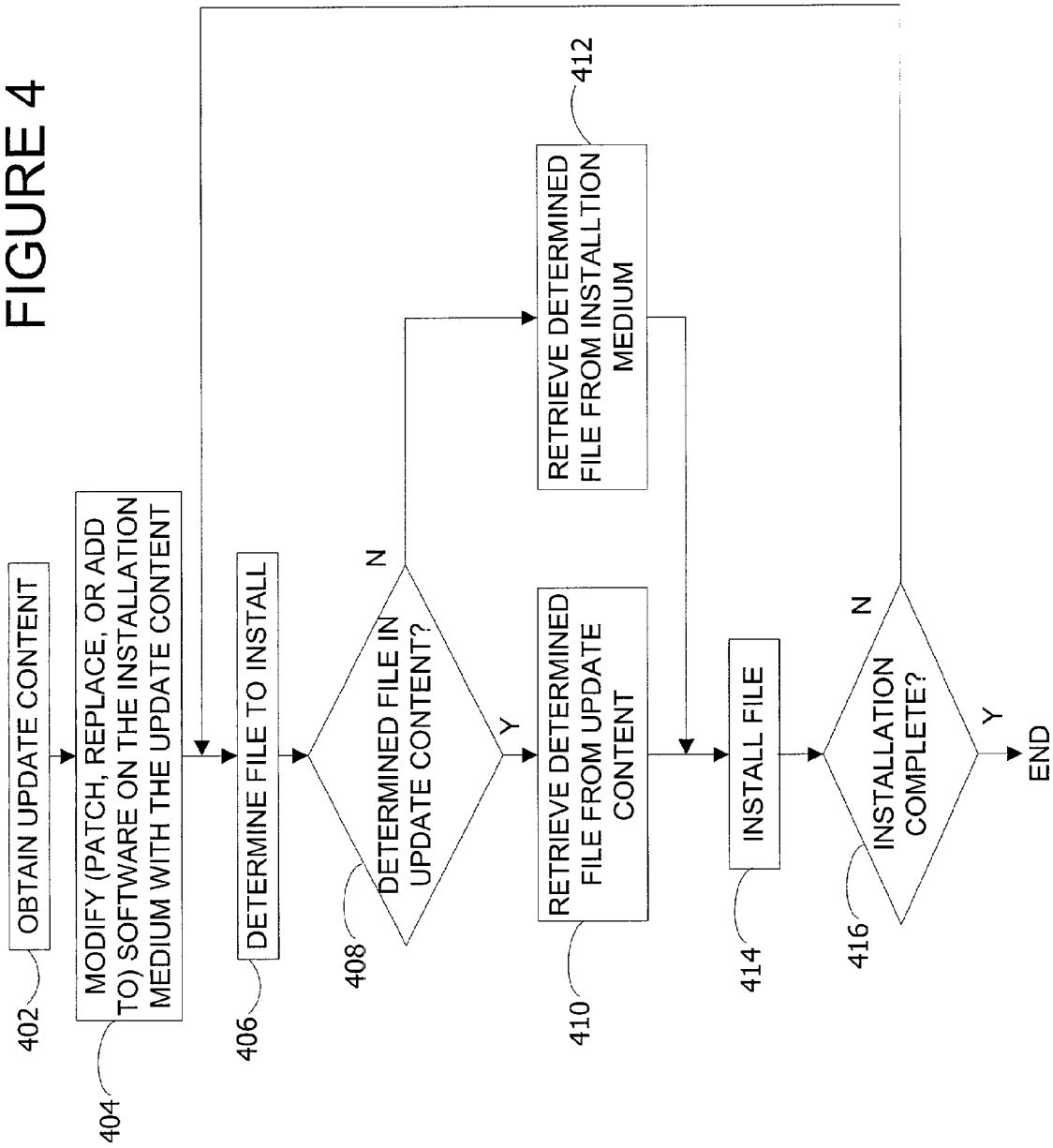
FIG. 4 is a flow chart of one embodiment of the invention illustrating installation of update content.

Referring next to FIG. 4, a flow chart illustrates installation of update content. The setup process may be performed by execution of an installation application program. The setup process includes obtaining the update content at 402 and modifying the software at 404 on the installation medium. Modifying the software includes, but is not limited to, patching, replacing, or adding to the software on the installation medium using the update content. If the installation medium is writeable, the installation medium is altered during the modifying at 404. If the installation medium is read-only, the installation application program modifies the software during installation via the process next described at 406-416.

In one embodiment, the update content and the software on the installation medium are organized into files. Installation includes installing each file onto a destination medium. Installation includes determining at 406 the next file to install and determining at 408 whether each file to be installed is available in the update content. The setup process retrieves the file from the update content at 410 if the update content includes the specific file. The setup process retrieves the file from the installation medium at 412 if the update content does not include the specific file. The setup process installs the file at 414 and determines at 416 whether installation is complete. The setup process either continues with the next file to be installed or terminates if installation is incomplete or complete, respectively.

Further, the update content may include one or more drivers to update or add to the drivers on the installation medium (see FIG. 6). The setup process installs these drivers (not shown in FIG. 4) onto the destination medium. Through the dynamic update, the drivers are effectively updated or added to throughout the product lifecycle.

In an embodiment in which the installation medium is writeable, the update content may be merged with the software on the writeable installation medium prior to installation of the software. For example, the update content may be merged with the software on the writeable installation medium at various times during the setup process. In an alternative embodiment in which the installation medium is read-only, the update content can be stored on at least one writeable computer-readable medium accessible by the destination machine for use by the setup process. To install the software in the embodiment in which the installation medium is read-only, the setup process searches the computer-readable medium storing the update content for each file. If the file is not found, the setup process searches the installation medium for the file. After the file is located, the setup process installs the file onto the destination medium. The invention includes one or more computer readable media having computer-executable instructions for performing the method illustrated in FIG. 4.

Appendix A describes an application programming interface for communication between the installation application program and the update site.

Figure 5:
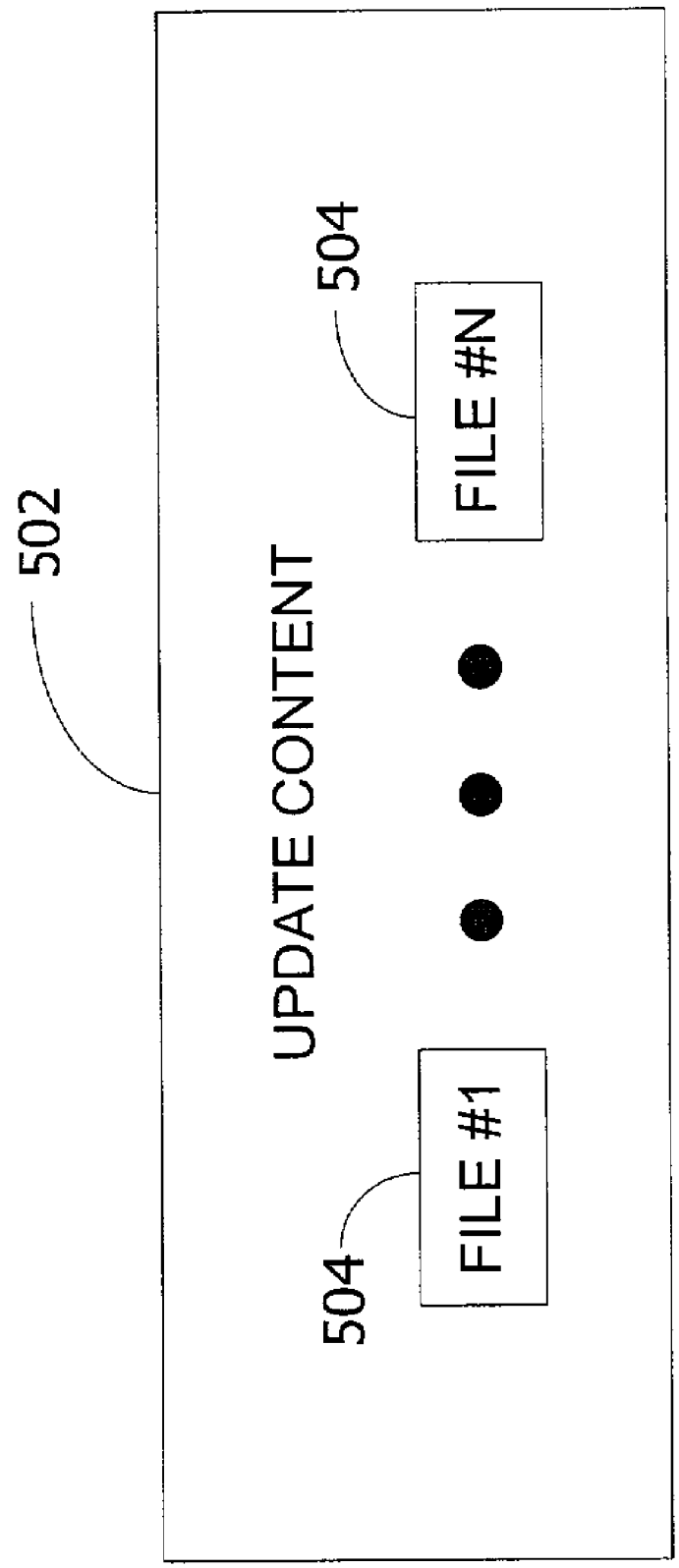
FIG. 5 is a block diagram of one embodiment of the invention illustrating the update content.

Referring next to FIG. 5, a block diagram illustrates the update content. The update content 502 includes one or more files 504 illustrated by file #1 through file #N. According to the invention, the update file 504 includes patches, replacement files, and/or drivers.

Referring next to FIG. 6, a block diagram illustrates the connections between an installation application pro gram 602, an installation medium 604, an update site 606, and a destination medium 608. The system illustrated in FIG. 6 dynamically updates software with update content. The update site 606 delivers update content to a destination medium 608 having access to at least one installation medium 604 storing installation data 610. The installation medium 604 includes installation data 610 for installation on the destination medium 608. The installation data 610 includes, but is not limited to, operating system software 612 or application program software 614. The update site 606 includes at least one update medium 616 storing update content such as one or more patches 618, one or more replacement files 620, and one or more drivers 622. The replacement file is an update to the installation data 610 or the installation application program 602. In the embodiment of FIG. 6, the drivers 622 include one or more in-box drivers 624 and one or more out-of-the-box drivers 626.

The installation application program 602 accesses the installation medium 604, the update site 606, and the destination medium 608 via at least one network such as network 628 to obtain and install installation data 610 and update content on the destination medium 608. The network 628 may be a telecommunications medium such as the Internet, a telephone line, a local area network, or any other network such as described in connection with FIG. 1. In one embodiment, the installation application program 602 executes on the destination machine to receive the update content from the update site 606 and to merge the received update content with the installation data 610 on the installation medium 604 prior to installing the installation data 610. The installation application program 602 installs the installation data 610 on the destination machine.

The installation application program 602 constitutes means for obtaining update content from the update medium 616 and means for merging the update content with the software on the installation media prior to installing the software on the destination machine. Further, the examples described above and examples described elsewhere herein constitute means for obtaining update content from the update medium 616 and means for merging the update content with the software on the installation media prior to installing the software on the destination machine.

Those skilled in the art will note that the installation data 610 may be stored on one or more installation media and that the installation medium 604, update site 606, and destination medium 608 may be accessible by the installation application via the network 628 or a direct connection. For example, the installation application program 602 may be stored on a computer-readable medium associated with the installation medium 604, the update site 606, and/or the destination medium 608. Further, the patches 618, replacement files 620, drivers 622, or other update content on the update site 606 may be stored on one or more update media such as update medium 616. The installation medium 604, the update medium 616, the destination medium 608, or any other media used with the invention are computer-readable media such as described in connection with FIG. 1. In addition, the network 628 connecting the installation application program 602, the installation medium 604, the update site 606, and the destination medium 608 may be individual networks, part of the same network (i.e., the Internet), or a combination of networks such as those described with reference to FIG. 1 (see above).

Those skilled in the art will also note that the installation medium 604, the update medium 616, and the destination medium 608 may be the same computer-readable medium or any number of separate computer-readable media. For example, the update content may be stored on the destination medium 608 or the installation medium 604. Similarly, the update content and the installation data 610 may reside on the destination medium 608 prior to operation of the method of the invention. Such an embodiment occurs when the update content and the installation data 610 are stored on the destination medium 608 prior to installation of the installation data 610.

Further, the invention is robust in that the installation application program 602 can be re-started if interrupted due to, for example, a lost connection between the destination medium 608 and the update site 606. The installation application program 602 stores its state when interrupted, and passes such state information to the update site 606 during re-connection as meta-data information. That is, the installation application program 602 gathers its state information and stores such information in memory accessible by the installation application program 602 if an interruption occurs during execution of the installation application program. For example, memory such as memory 134, 192, or any memory accessible by non-volatile memory interface 166 is suitable for storing the state information. In this manner, the installation application program 602 can resume execution where processing was interrupted by omitting steps that were completed prior to the interruption. In another embodiment, the memory is stored on a computer-readable medium associated with the update site 606. During a re-connection, the update site 606 conveys the state information to the installation application program 602.

The installation application program 602 can skip the downloading of files that have already been downloaded to improve the seamless manner in which dynamic update restarts. In one example, the installation application program 602 may have downloaded all the files needed to perform the dynamic update but not installed the files. The installation application program 602 experiences an interruption such as the user stopping the installation application program 602. Within a particular time period, the user can re-start the installation application program 602 to install the downloaded files. In another example, the installation application program 602 is interrupted during downloading of the necessary files. The installation application program 602 indicates where downloading was interrupted by storing such information as part of the state information created by the installation application program 602 after receiving the interruption. The installation application program 602 passes the stored state information to the update site 606 during a subsequent execution of the installation application program 602 to resume downloading the files that were not downloaded previously.

Referring next to FIG. 7, a block diagram illustrates an updating component 702, a publishing component 704, and an installing component 706. A computer-readable medium 701 has one or more computer-executable components for dynamically updating software on an installation medium prior to installation of the software on a destination machine. The computer-readable medium 701 includes the updating component 702, the publishing component 704, and the installing component 706. The updating component 702 executes on the destination machine to obtain update content and apply the update content to the software to update the software. The update content supersedes the software on the installation medium during installation. The updating component 702 includes an analyzing component 708, a requesting component 710, a receiving component 712, and an applying component 714. The analyzing component 708 analyzes hardware and/or software on the destination machine. The requesting component 710 requests at least one of the files related to the analyzed hardware and/or software. The receiving component 712 receives the requested files. The applying component 714 applies the received, requested files to the software on the installation medium. Applying or merging the received files includes patching, replacing, or adding to the software. The publishing component 704 identifies and verifies the update content for publication on the update site. The installing component 706 installs the updated software on the destination machine.

In addition, the analyzing component 708 passes destination machine information to the dynamic update site such as extensible meta-data information including, but not limited to, SKU, version information, connection speed, processor information, and whether the OS installation is an upgrade or a new OS installation. In this manner, the dynamic update site can send to the destination machine the appropriate level, number, and type of updates. In addition, the updates can be sent individually or as a package of updates.

In one embodiment, a computer-readable medium such as computer-readable medium 701 illustrated in FIG. 7 has a repository component for storing the update content and delivering the update content to the updating component 702. In this embodiment, a telecommunications medium such as the Internet connects the updating component 702 and the repository component.

The following example illustrates the invention. In this example, the update content is divided into two categories: drivers and replacement files. Drivers are only downloaded for the devices which are present in the machine. Two types of drivers can be downloaded including in-box and out-of-the-box drivers. An in-box driver may have a critical fix. The fixed files for the in-box driver will be treated as replacement files. The out-of-the-box-box drivers are downloaded from the update site as compressed files (e.g., cabinet files or executable files).

Replacement files are updated files to replace the existing files on installation media such as one or more product CDs. No new files are added to the product here. This category includes the following types of files: updates, upgrade device information files, setup fixes, and assembly fixes.

Updates include fixes to any files. Update files include, but are not limited to, replacement files for any file on the OS CD including application compatibility files and any critical fixes to OS files. In addition, those skilled in the art will note that the update files may include files, critical or otherwise, that are not present on the OS CD. All drivers that are on the installation media and have a critical fix are also included in this package. The update files are saved for later use by the setup process after downloading. The setup process creates a file with an updates section that lists all the downloaded update files. This list is used to identify the downloaded files. All files should be included with the same layout as on the installation media.

Upgrade device information files include files used during an OS upgrade. Upgrade device information files include all files that are useful during the upgrade process only. Setup fixes include fixes to files used by the installation application program. Setup fixes include fixes that are related to running setup only and are not installed. This set of files is used by setup only and includes any critical fixes that are important at setup time. The downloaded setup fixes are deleted after processing. Assembly fixes include any fixes to assemblies. Assemblies are installed in addition to the ones on the installation media instead of a simple replacement.

The update site houses all the content for the dynamic updates. There is one catalog for a major OS release per supported language, which also includes content for all SKUs for this OS.

An OS installation program installs the operating system software on a PC. This installation program includes a dynamic update component, which connects to the update site at the time of installation and downloads the appropriate dynamic update content for the OS being installed. The installation program has been further modified to integrate the downloaded dynamic update content so that updated files are installed instead of the files that are shipped on the CD.

In particular, the setup process interfaces with dynamic update client side code (update control) running on client machine to interact with dynamic update content on the update site. Setup initializes the update control code with the required information about target OS. Update control checks the registry key and uses the URL specified by this key, if available. For example, the following key may be used.

[HKEY_LOCAL_MACHINE\SOTFTWARE\Current Version\Setup\5.1]"DynamicUpdateUrl"="http://test/bld5.1"

If this key is not present, update control will access a default site with a hardcoded URL.

Setup downloads updates as compressed files to a specified folder. Setup will process the compressed files and install the updated files. The update control is able to self-update so that it can be updated to handle any changes to the update site.

In yet another alternative embodiment, users will be asked to check compatibility before running setup. "Check System Compatibility" is a menu item on an auto run menu. This menu item points to an upgrade advisor or other readiness analyzer which analyzes the machine and gives an upgrade report. The upgrade advisor tool uses the latest data sources for drivers and an application compatibility database so that the results produced are in sync with the results produced by an upgrade report during setup.

During an upgrade report performed by the setup process, the end user is informed about any critical items, which should stop the setup such as missing drivers for a mass storage driver or the communications device (e.g., a modem or a network interface card). Other report items are hidden and available in the upgrade report saved on the computer.

The setup process checks for required disk space, memory and any other requirements before performing the dynamic update step. If the setup process cannot run due to any of these requirements, there is no need to perform the dynamic update. After an estimated download size is known, the setup process should check disk space and make sure that there is enough disk space available. The estimated download size only indicates the size of the compressed files and does not give any indication about the total disk space required. Another disk space check is made after dynamic update process to ensure that the setup process does not run out of disk space later in the setup process. The setup process deletes all downloaded temporary files after installation is complete.

In an alternative embodiment, the installation application program installs updates in a corporate scenario. A corporation typically does not want to connect to the update site for every installation to have a consistent installation approved by the information technology department of the corporation. The corporation downloads all required fixes from the update site to a network share and installs these updates on destination machines from this share. Drivers are downloaded independently in the same network share. The corporate installation is from a network install share.

Client installation can be initiated from the command line or in unattended mode. When client installation is run, an upgrade report runs detection on the client machine and determines whether a device found in the machine is present on the OS media. If a driver is not present on the OS media, then the setup process walks through the driver folders on the dynamic updates share and checks if the driver exists there. If the driver exists on the dynamic updates share, the driver is installed on the client. Through the dynamic update, the drivers are effectively updated or added to throughout the product lifecycle.

In other alternative embodiments, the following information is logged during the dynamic updates process: all calls made to the update control and return codes from these calls and all compressed files which are downloaded for dynamic updates.

In one embodiment, instead of including a replacement file in the update content, a patch is included. Setup applies each patch to the original file from the OS CD and creates a new file to install.

The UI for dynamic update, in one embodiment, informs the user about the benefits of dynamic update and lets the user choose whether dynamic updates should be downloaded. The default choice is to download the updates. The user is also informed about the various actions performed by dynamic update (e.g., connecting to the update site and downloading important updates for setup). The dynamic update gathers the latest setup software from the software publisher or producer to help ensure the computer installs the OS successfully. Once the user chooses the option to download dynamic updates, the total estimated time is provided. The user is given visual feedback about the progress by updating the time remaining for the download. The user has the option of canceling the dynamic update download by hitting a specific key on the keyboard. If the user presses a specified key and waits to confirm, the dynamic update continues to download until the cancel is confirmed. If there is a download error while the dynamic update waits for the user to confirm the cancel, the error message is not shown immediately. If user confirms the cancel then the error message is not shown. Otherwise, the error message is shown. Once the processing has started, the user does not have an option to cancel the dynamic update during the processing phase. After downloading the compressed files, the files are extracted. This extraction is indicated to the user as "Performing Dynamic Update" or "Updating Setup." If an attempt to connect to the update site fails, the user is given the option of connecting to the Internet manually (default), retrying the connection using the existing Internet connection, or skipping dynamic update and continuing to install the OS.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

APPENDIX A

The following application programming interfaces are private APIs used for communication between the installation program and the update site.

Is supported - This function checks whether the destination machine is capable of dynamic update by verifying that machine has appropriate web browsing software.

Initialize - This function initializes the installation program with necessary information.

Detection - The installation application performs the hardware detection and prepares a list of all hardware on the machine. This list will be further filtered for the drivers, which do not exist on distribution medium by using the compiled hardware database information available on the distribution medium. This makes a list of drivers to be downloaded.

Download - The installation program downloads all the updates which include any number of driver cabinets depending on the machine and one or more of the following cabinets: undates.cab, upginfs.cab, winnt32.cab, and duasm.cab. Downloaded cabinets are checked for proper certification.

What is claimed is:

1. A method comprising:
dynamically and automatically updating, independent of user interaction, an operating system component prior to installation of the operating system component on at least one destination machine, said method further comprising:
identifying update content related to the operating system component, initiated from one or more installation media, before installing the operating system component on the destination machine from the one or more installation media, said operating system component being stored on the installation media and being adapted for installation on the destination machine from the one or more installation media, said identified update content being specific to the operating system component and the destination machine, wherein the installation media being different from the destination machine;
obtaining the identified update content from one or more update media, said update media being remote from the destination machine;
merging the update content with the operating system component stored on the installation media;
creating an updated operating system component on the destination machine from the merged operating system component before installing the updated operating system component on the destination machine;
specifying a key in a registry to automate installation of the updated operating system component; and
installing the updated operating system component on the destination machine according to the specified key.

2. The method of claim 1, wherein obtaining update content comprises obtaining update content from one or more media remote from the destination machine via a network.

3. The method of claim 2, wherein the network is the Internet.

4. The method of claim 1, wherein the update content includes at least one file.

5. The method of claim 1, wherein the update content includes a patch.

6. The method of claim 5, wherein the patch modifies the operating system component on the installation media prior to installation on the destination machine.

7. The method of claim 1, wherein the update content includes a driver for controlling hardware on the destination machine.

8. The method of claim 1, wherein identifying the update content comprises analyzing hardware or software or both on the destination machine.

9. One or more computer readable media having computer-executable instructions for performing the method recited in claim 8.

10. The method of claim 1, wherein the operating system component comprises operating system software or application program software or both.

11. The method of claim 1, wherein merging the update content with the operating system component comprises one or more of the following: patching, replacing, and adding to the operating system component on the one or more installation media.

12. The method of claim 1, further comprising extracting at least one file from the update content during the installation of the operating system component.

13. The method of claim 1, further comprising pre-processing the update content in preparation for installation.

14. The method of claim 1, wherein the operating system component comprises one or more files, and wherein installing the updated operating system component on the destination machine comprises:
searching the update content for each of the files; and
searching the one or more installation media for each of the files not found in the update content.

15. The method of claim 1, further comprising specifying a key in a registry to automate installation of the updated operating system component.

16. One or more computer readable media having computer-executable instructions for performing the method recited in claim 1.

17. One or more computer-readable media having one or more computer-executable components for dynamically updating an operating system prior to installation of the operating system on a destination machine, said components comprising:
a publishing component for initiating the dynamic update of the operating system by automatically identifying, independent of user interaction, update content related to the operating system stored on the installation medium before installing the operating system, said operating system being stored on one or more installation media and being adapted for installation on the destination machine from the installation media, said identified update content being specific to the operating system component and the destination machine, wherein the installation media being different from the destination machine;
an updating component on the destination machine for automatically obtaining the update content identified by the publishing component from a source remote from the destination machine, said updating component further automatically applying the obtained update content to the operating system to update the operating system prior to installation of the updated operating system on the destination machine; and
an installation component for automatically installing the updated operating system obtained by the updating component on the destination machine.

18. The computer-readable medium of claim 17, further comprising a repository component for storing the update content and delivering the update content to the updating component.

19. The computer-readable medium of claim 18, wherein a communications medium connects the updating component and the repository component.

20. The computer-readable medium of claim 19, wherein the communications medium is the Internet.

21. The computer-readable medium of claim 17, wherein the update content includes one or more files selected from a group consisting of drivers, replacement files, and patches.

22. The computer-readable medium of claim 17, wherein the update content comprises one or more files, and wherein the updating component includes routines for:
analyzing hardware or software or both on the destination machine;
requesting at least one of the files related to the analyzed hardware or software or both;
receiving the requested files; and
applying the received, requested files to the operating system on the installation medium.

23. The computer-readable medium of claim 22, wherein the routine for analyzing hardware or software or both on the destination machine comprises a routine for gathering meta-data information to identify the files to be requested.

24. The computer-readable medium of claim 23, wherein the meta-data information is selected from a group consisting of SKU, version information, connection speed, processor information, and a flag to indicate an upgrade installation or a new installation.

25. The computer-readable medium of claim 17, wherein the update content supersedes the operating system on the installation medium during installation.

26. The computer-readable medium of claim 17, wherein the publishing component verifies the update content.

27. A system comprising:
means for dynamically and automatically updating independent of user interaction an application program prior to installation on at least one destination machine, said system further comprising:
means for initiating the dynamic updating of the application program by identifying update content relating to the application program stored on one or more installation media, said application program being adapted for installation on a destination machine, said identified update content being specific to the operating system component and the destination machine, wherein the installation media being different from the destination machine;
means for obtaining the update content identified by the means for identifying from one or more update media, said update media being remote from the destination machine on which the application program is to be installed;
means for merging the update content obtained by the means for obtaining with the application program on the installation media to create an updated application program, said updated application program being created before the application program is installed on the destination machine; and
means for installing the updated application program on the destination machine.

28. The system of claim 27, wherein the application program comprises operating system software.

29. The method of claim 1, wherein the operating system component comprises a first plurality of files, wherein the update content comprises a second plurality of files, and wherein installing the updated operating system component on the destination machine comprises replacing one or more of the first plurality of files with corresponding files from the second plurality of files.

30. The method of claim 1, wherein the obtained update content comprises one or more files, and wherein merging the update content comprises adding the one or more files to the operating system component.

31. The method of claim 8, wherein obtaining the identified update content comprises obtaining, from the one or more update media remote from the destination machine, update content specific to the analyzed hardware or software or both on the destination machine.

* * * * *